(12) United States Patent
Sandberg et al.

(10) Patent No.: US 10,712,965 B2
(45) Date of Patent: Jul. 14, 2020

(54) APPARATUS AND METHOD FOR TRANSFERRING DATA BETWEEN ADDRESS RANGES IN MEMORY

(71) Applicant: ARM LIMITED, Cambridge (GB)

(72) Inventors: Andreas Lars Sandberg, Cambridge (GB); Nikos Nikoleris, London (GB); David Hennah Mansell, Norwich (GB)

(73) Assignee: ARM Limited, Cambridge (GB)

( * ) Notice: Subject to any disclaimer, the term of this patent is extended or adjusted under 35 U.S.C. 154(b) by 75 days.

(21) Appl. No.: 15/806,580

(22) Filed: Nov. 8, 2017

(65) Prior Publication Data

US 2018/0157437 A1    Jun. 7, 2018

(30) Foreign Application Priority Data

Dec. 2, 2016    (GR) .............................. 20160100612

(51) Int. Cl.
*G06F 3/06* (2006.01)
*G06F 12/10* (2016.01)
(Continued)

(52) U.S. Cl.
CPC .......... *G06F 3/0647* (2013.01); *G06F 3/0611* (2013.01); *G06F 3/0673* (2013.01);
(Continued)

(58) Field of Classification Search
CPC .... G06F 3/0647; G06F 3/0611; G06F 3/0673; G06F 12/0831; G06F 12/10; G06F 12/1009; G06F 12/1027; G06F 2212/1024
See application file for complete search history.

(56) References Cited

U.S. PATENT DOCUMENTS 6,654,830 B1    11/2003    Taylor et al.
8,565,545 B1    10/2013    Syed et al.
(Continued)

FOREIGN PATENT DOCUMENTS

EP    1 555 604    7/2005

OTHER PUBLICATIONS

Combined Search and Examination Report for GB1700214.8 dated Jul. 4, 2017, 8 pages.
(Continued)

*Primary Examiner* — Reginald G Bragdon
*Assistant Examiner* — Edward Wang
(74) *Attorney, Agent, or Firm* — Nixon & Vanderhye P.C.

(57) ABSTRACT

An apparatus and method are provided for transferring data between address ranges in memory. The apparatus comprises a data transfer controller, that is responsive to a data transfer request received by the apparatus from a processing element, to perform a transfer operation to transfer data from at least one source address range in memory to at least one destination address range in the memory. A redirect controller is then arranged, whilst the transfer operation is being performed, to intercept an access request that specifies a target address within a target address range, and to perform a memory redirection operation so as to cause the access request to be processed without awaiting completion of the transfer operation. Via such an approach, the apparatus can effectively hide from the source of the access request the fact that the transfer operation is in progress, and hence the transfer operation can be arranged to occur in the background, and in a manner that is transparent to the software executing on the source that has issued the access request.

20 Claims, 11 Drawing Sheets

(51) Int. Cl.
    *G06F 12/1027*     (2016.01)
    *G06F 12/1009*     (2016.01)
    *G06F 12/0831*     (2016.01)

(52) U.S. Cl.
    CPC .......... *G06F 12/0831* (2013.01); *G06F 12/10* (2013.01); *G06F 12/1009* (2013.01); *G06F 12/1027* (2013.01); *G06F 2212/1024* (2013.01)

(56) References Cited

U.S. PATENT DOCUMENTS

| | | | |
|---|---|---|---|
| 8,601,220 B1 | 12/2013 | Corbin et al. | |
| 9,354,907 B1 | 5/2016 | Teli et al. | |
| 2004/0133756 A1 | 7/2004 | Shaw | |
| 2010/0161923 A1* | 6/2010 | GadelRab | G06F 12/02 711/162 |
| 2010/0287345 A1 | 11/2010 | Cherian et al. | |
| 2012/0137098 A1* | 5/2012 | Wang | G06F 3/0617 711/165 |
| 2016/0232077 A1* | 8/2016 | Hu | G06F 11/3632 |

OTHER PUBLICATIONS

Examination Report for GB Application No. 1700214.8 dated Oct. 28, 2019, 5 pages.
Examination Report for GB Application No. 1700214.8 dated Mar. 20, 2020, 3 pages.

\* cited by examiner

US 10,712,965 B2

APPARATUS AND METHOD FOR TRANSFERRING DATA BETWEEN ADDRESS RANGES IN MEMORY

This application claims priority to GR Patent Application No. 20160100612 filed Dec. 2, 2016, the entire content of which is hereby incorporated by reference.

BACKGROUND

The present technique relates to an apparatus and method for transferring data between address ranges in memory.

Within data processing systems, situations may arise where it is desired to move blocks of data between different physical locations in memory. For example, often the memory system will be arranged as a series of pages, and it may be desired to migrate data from one page to another page, to merge multiple smaller pages into a larger page, etc.

Often, the operating system running on a processor within the system may be used to manage the transfer of the data between the different physical locations in memory. However, the process of transferring the data under such software control can take a significant period of time. This not only consumes significant processor resources, but also requires steps to be taken during that period to ensure that any attempted accesses to the data that is being subjected to the transfer operation do not give rise to inconsistencies in the data. Often this may require write accesses to be blocked until the transfer operation is complete.

Furthermore, when performing such data migration tasks under operating system control, the process typically requires multiple memory management operations, which can also give rise to performance issues due to the time taken to perform those memory management operations.

It would hence be desirable to provide an improved mechanism for handling the transferring of data between address ranges in the memory.

SUMMARY

In a first example configuration, an apparatus is provided that comprises: a data transfer controller, responsive to a data transfer request received by the apparatus from a processing element, to perform a transfer operation to transfer data from at least one source address range in memory to at least one destination address range in the memory; and a redirect controller arranged, whilst the transfer operation is being performed, to intercept an access request that specifies a target address within a target address range, and to perform a memory redirection operation so as to cause said access request to be processed without awaiting completion of the transfer operation.

In a further example configuration, there is provided a system comprising: a plurality of processing elements; an interconnect coupled to said plurality of processing elements and for controlling access to a memory by said plurality of processing elements; the interconnect having a transfer engine formed by an apparatus in accordance with the first example configuration, for performing a transfer operation on behalf of one of the processing elements in order to transfer data from at least one source address range to at least one destination address range, whilst enabling access requests issued by the plurality of processing elements in respect of the data that is being subjected to the transfer operation to continue to be processed whilst the transfer operation is being performed.

In a yet further example configuration, there is provided a method of transferring data between address ranges in memory, comprising: responsive to a data transfer request received from a processing element, employing a data transfer controller to perform a transfer operation to transfer data from at least one source address range in the memory to at least one destination address range in the memory; and whilst the transfer operation is being performed, intercepting an access request that specifies a target address within a target address range, and performing a memory redirection operation so as to cause said access request to be processed without awaiting completion of the transfer operation.

In a yet further example configuration, there is provided an apparatus, comprising: data transfer control means for performing, in response to a data transfer request received by the apparatus from a processing element, a transfer operation to transfer data from at least one source address range in memory to at least one destination address range in the memory; and redirect control means for intercepting, whilst the transfer operation is being performed, an access request that specifies a target address within a target address range, and for performing a memory redirection operation so as to cause said access request to be processed without awaiting completion of the transfer operation.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
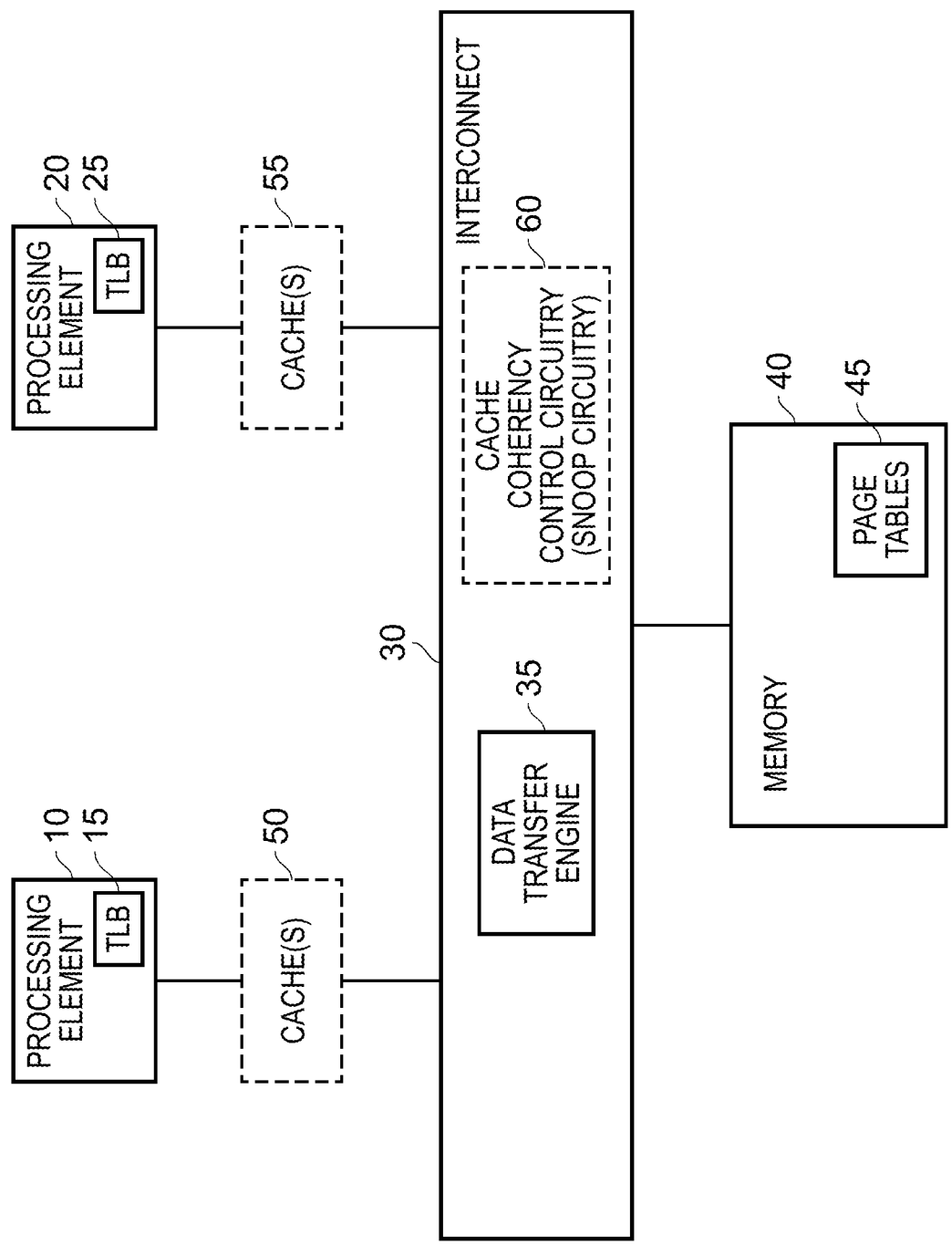
FIG. 1 is a block diagram of a system in accordance with one embodiment.

Before discussing the embodiments with reference to the accompanying figures, the following description of embodiments is provided.

In one example embodiment, an apparatus is provided that comprises a data transfer controller and a redirect controller. The data transfer controller is responsive to a data transfer request received by the apparatus from a processing element, to perform a transfer operation to transfer data from at least one source address range in memory to at least one destination address range in the memory. The source address range(s) and destination address range(s) can be specified in a variety of ways, but in one embodiment are provided as information within the data transfer request received from the processing element.

The redirect controller is then arranged, whilst the transfer operation is being performed, to intercept an access request that specifies a target address within a target address range, and to perform a memory redirection operation so as to cause the access request to be processed without awaiting completion of the transfer operation.

By such an approach, certain access requests can be intercepted by the apparatus of the above embodiment, and subjected to a memory redirection operation in order to cause those access requests to be processed even though the transfer operation has not yet completed. The apparatus can hence, in effect, hide from the source of such an access request the fact that there is a transfer operation in progress. From the viewpoint of the source of the access request, the transfer operation happens in the background and may be arranged to be transparent to software executing on that source. Access requests issued by such a source that specify an address within the target address range are not blocked whilst the transfer operation is in progress, thereby significantly improving performance.

The target address range can be specified in a variety of ways, but in one embodiment the system in which the apparatus is used is organised such that, whilst the transfer operation is taking place, any access requests issued in relation to data that is being subjected to that transfer operation will specify target addresses that are within the target address range, and accordingly will be intercepted by the redirect controller and subjected to the memory redirect operation.

In one embodiment, the apparatus further comprises a setup controller arranged to receive the data transfer request, and to issue a control signal that causes access requests issued whilst the transfer operation is being performed, and that relate to the data being transferred by the transfer operation, to specify as the target address an address within the target address range. The control signal can take a variety of forms. For example, the setup controller may itself directly update address translation structures that are used to determine addresses for access requests, for example page tables in memory, so that the access requests issued whilst the transfer operation is being performed, and that relate to the data being transferred by the transfer operation, will specify addresses within the target address range. Where the various processing elements within the system that can issue access requests to the relevant portion of memory employ associated address translation stores (for example translation lookaside buffers (TLBs)) for buffering address translation data used by those processing elements, the setup controller may also issue control signals to cause the relevant portions of those address translation stores to be invalidated, which for example will ensure that the updated page tables are referred to instead when an access is next issued relating to the relevant address range.

In an alternative embodiment, the setup controller may not itself undertake such tasks, and instead the control signal can take the form of an acknowledgement signal returned to the processing element that issued the data transfer request, with the processing element being arranged to be responsive to the acknowledgement signal to perform the above described tasks. Hence, for example, that processing element may update the page tables in memory so that subsequent access requests issued in respect of the data being transferred will map to addresses within the target address range, and may in addition invalidate the relevant entries in its own address translation store, and broadcast a signal to other processing elements in the system to ensure that they also invalidate the relevant portions of their local address translation stores.

The target address range can take a variety of forms. It may for example be arranged to be said at least one source address range, whilst in another embodiment it may be arranged to be said at least one destination address range. As a further alternative, the target address range may be a dedicated address range associated with the apparatus. Where the target address range is said at least one destination address range, then the control signal issued by the setup controller will cause the relevant address translation structures to be updated prior to the transfer operation being performed, so that any access requests issued whilst the transfer operation is being performed, and relating to the data being transferred, will point to an address within the destination address range, and on that basis will be intercepted by the redirect controller. If alternatively the target address range is chosen to be said at least one source address range, then the relevant address translation structures may not be updated before the transfer operation begins, so that any access requests issued whilst the transfer operation is taking place will be issued to addresses within the source address range, and accordingly will be intercepted by the redirect controller. Once the transfer operation has been completed, then the memory management structures may be updated so that subsequent accesses to the relevant data will point to addresses within the destination address range.

In the example where a dedicated address range associated with the apparatus is used, then prior to the transfer operation taking place the relevant address translation structures will be updated so that any access requests issued in respect of the data being transferred, whilst the transfer operation is taking place, will be issued to addresses within the dedicated address range of the apparatus. In such an arrangement, it can be arranged that the redirect controller will only receive access requests that specify an address within that dedicated address range, and hence does not need to determine whether an access request needs to be intercepted or not. In particular, any access request that the redirect controller receives whilst a transfer operation is being performed will be treated as intercepted and hence subjected to the memory redirection operation. Once the transfer operation has completed, then the address translation structures can be updated again so that any subsequent accesses in respect of the relevant data will point to addresses within the destination address range.

There are a number of ways in which the memory redirection operation may be performed by the redirect controller. In a first example embodiment, the redirect controller is arranged to perform said memory redirection operation such that: when the intercepted access request is a read access request, the target address is mapped to a corresponding source address within said at least one source address range so as to cause a read operation to be performed from said corresponding source address; and when the intercepted access request is a write access request, the target address is mapped to a corresponding source address within said at least one source address range and a corresponding destination address within said at least one destination address range so as to cause a write operation to be performed to both the corresponding source address and the corresponding destination address. Such an approach ensures that the original version of the data and the copied version being created within the at least one destination address range stay in sync, but duplicates write operations. Nevertheless, the overhead of this approach is likely to be low if the address ranges in question are not used heavily, and accordingly the occurrence of such write access requests during the period that the transfer operation is being performed will be low.

In an alternative embodiment, said data transfer controller is arranged to maintain a record of progress of the transfer operation, and the redirect controller is arranged to perform the memory redirection operation such that: when the target address of the intercepted access request relates to an address whose data has yet to be transferred by the transfer operation, the target address is mapped to a corresponding source address so as to cause an access to be performed to that corresponding source address; and when the target address of the intercepted access request relates to an address whose data has already been transferred by the transfer operation, the target address is mapped to a corresponding destination address so as to cause an access to be performed to that corresponding destination address. Such an approach requires the redirect controller to monitor the information maintained by the data transfer controller as to the progress being made with the transfer operation, in order to decide how to process the intercepted access request, but avoids the requirement to duplicate the write operation where the intercepted access request is a write request. Often, the transfer operation is performed sequentially with regard to the addresses within the source address range(s), and accordingly the state information required to identify the data that has been transferred and the data that has yet to be transferred is relatively small.

In a yet further alternative embodiment, the data transfer controller may be arranged to maintain a record of progress of the transfer operation, and the redirect controller is arranged to perform the memory redirection operation such that: when the target address of the intercepted access request relates to an address whose data has yet to be transferred by the transfer operation, the data transfer controller is arranged to initiate transfer of a block of data that includes the data associated with the target address, prior to processing the intercepted access request; and when the target address of the intercepted access request relates to an address whose data has already been transferred by the transfer operation, the target address is mapped to a corresponding address that is one of the corresponding source address and the corresponding destination address, so as to cause an access to be performed to that corresponding address.

In one embodiment, when the target address of the intercepted access request relates to an address whose data has already been transferred by the transfer operation, the target address is mapped to the corresponding destination address, since it is assumed that the most up-to-date version will be maintained within the destination address range. However, in an alternative embodiment, a copy on write mechanism could be employed where, when a write operation is performed, the original data at the source address is copied to the destination address and then the write is performed on the data at the source address. In that scenario, it would be appropriate, when the target address of the intercepted access request relates to an address whose data has already been transferred by the transfer operation, to map the target address to the corresponding source address. For the following discussions, it will be assumed that the target address is mapped to the destination address as per the first option discussed above.

There are a number of ways in which the intercepted access request can be processed when it relates to data that has yet to be transferred, following the initiation of the transfer of a block of data that includes the data associated with the target address. For example, in one embodiment, the access request may be temporarily stalled whilst that block of data is transferred, the progress record is then updated to identify that the data has been transferred, and then the access request is processed, by mapping the target address to a corresponding destination address. However, performance may be improved by effectively merging the processing of the access request with the transfer of the block of data. For example, the transfer of the block of data will involve the data transfer controller reading the block of data from the relevant source address range, and then writing that data out to the relevant destination address range. Where the access request is a read access request, then once the data has been read, the required data for the access request can be obtained directly from the read data block, and returned in order to process the access request. Similarly, if the access request is a write access request, then once the block of data has been read, the write data specified by the write access request can be merged into the read data, with the consolidated merged data then being written out to the destination address range, thereby processing the write access request during the performance of the transfer of the block of data from the relevant source address range to the relevant destination address range.

In one embodiment, the apparatus may further comprise control storage to store control information used to control performance of the transfer operation by the data transfer controller, the control storage storing an indication of said at least one source address range, an indication of said at least one destination address range, and progress indication data identifying progress of the transfer operation. Additional information may also be retained if desired. For example, control data may be used to indicate a particular type of read access request that should be used when reading data from the source address range (as will be discussed in more detail later, this can improve cache utilisation by causing cached copies of data in the source range to be invalidated), or a valid flag or the like may be used to indicate entries whose contents relate to a transfer operation which has not yet been completed. On completion of the transfer operation, the relevant valid flag can then be cleared, to indicate that the entry can be reused for a subsequent data transfer request.

As mentioned earlier, in some embodiments the target address range may be either said at least one source address range or said at least one destination address range. In one embodiment, the redirect controller may be arranged to receive all access requests being issued to the memory whilst the transfer operation is in progress, and to determine which of those access requests should be intercepted, whilst in other embodiments the redirect controller may only receive a subset of the requests, with the interconnect determining which subset the redirect controller is to receive. In one embodiment the redirect controller may be arranged, whilst the transfer operation is being performed, to reference the control storage to determine whether a received access request is to be intercepted and thus subjected to the memory redirection operation. In particular, through such an approach, the redirection controller can detect when the address specified by an access request falls within the at least one destination address range (where the at least one destination address range is being used as the target address range), or the at least one source address range (when the at least one source address range is being used as the target address range), and accordingly can detect which access requests need to be intercepted.

Where the target address range is a dedicated address range associated with the apparatus, then such a check is not required, as the redirect controller can be arranged so that the only access requests that it receives are access requests specifying addresses associated with the dedicated address range of the apparatus, and will perform the memory redirection operation for all such received access requests. The control storage may then be referred to during the performance of the memory redirection operation in order to determine how to redirect the access request, depending on the memory redirection technique employed.

In one embodiment, the processing element is arranged to implement address translation of virtual addresses to corresponding physical addresses, and has access to an address translation store for storing address translation data used to convert a virtual address to a physical address within a page of said memory, said address translation data being derived from descriptor information stored in page tables within said memory, and the data transfer request is issued in order to transfer data from at least one source page to at least one destination page within the memory. The migration of data from one or more source pages to one or more destination pages within memory can occur for a variety of reasons within systems that implement virtual addressing. For example, it may be desired to migrate a number of discontiguous pages in physical memory to an area of physical memory where they can be merged to form a larger, contiguous, physical page (which will be referred to herein as a gather operation). Alternatively, it may be desired to split a larger page into a number of smaller pages (referred to as a scatter operation herein). Data migration may also be performed for other reasons, for example ECC (Error Correction Code) triggered data migration, data migration in non-uniform memory access (NUMA) systems, etc.

Within such embodiments that use virtual addressing, it is desirable to take steps to actively control the contents of the page tables within memory whilst the transfer operation is being performed, and to invalidate certain entries in the address translation store to ensure that those updated page tables are referred to for subsequent access requests issued whilst the transfer operation is taking place. For example, in one embodiment where the target address range is chosen to comprise said at least one destination address range, the setup controller may be arranged, prior to the data transfer controller performing said transfer operation, to issue a control signal to cause the page tables within said memory to be updated so that virtual addresses that were translated into physical addresses within said at least one source address range will instead be translated into physical addresses within said at least one destination address range, the setup controller further issuing a control signal to cause invalidation within the address translation store of any entries that provide address translation data for the data to be subjected to the transfer operation.

By taking such steps, it can be ensured that out-of-date information in the address translation store is not used for subsequent access requests issued in respect of the data that is being subjected to the transfer operation, and instead reference will be made to the updated page tables, as a result of which any such access requests will specify addresses within the at least one destination address range, and accordingly will be intercepted by the redirect controller.

As mentioned earlier, in one embodiment, the setup controller may issue control signals so as to directly update the page tables and/or to directly cause invalidation of the relevant entries in the address translation store. However, in an alternative embodiment the control signal(s) issued by the setup controller may take the form of an acknowledgement signal returned to the processing element that issued the data transfer request, with that processing element being responsive to such an acknowledgement signal to perform the required update to the page tables in memory, and to invalidate the relevant entries in its address translation store. In systems where multiple processing elements are provided that can access the memory, that processing element may also broadcast a signal to the other processing elements to cause them to also invalidate the relevant entries in their local address translation stores.

Whilst separate control signals can be issued by the setup controller to cause the update of the page tables to take place, and to cause the invalidation of the relevant entries within the address translation store, in one embodiment a single control signal can be issued to cause both steps to be performed.

As mentioned earlier, in an alternative embodiment where the source address range(s) are used for the target addresses, then update of the page tables and invalidation of the relevant address translation store entries can be deferred until after the transfer operation has completed.

The above described embodiments can provide significant performance benefits when compared with previous operating system controlled migration of data in physical memory. In particular, in the above described embodiments where the at least one destination address range or the at least one source address range is used as a target address range, the invalidation of the relevant entries within the address translation store (which for example may be a translation lookaside buffer (TLB)) only needs to occur once during performance of the data transfer process. In contrast, when adopting the known operating system controlled approach, the page tables in memory would initially be updated just to change the access rights for the source address range to read only, but without changing the address mapping, and at the same time the relevant range of addresses within the TLB structures would be invalidated to ensure that the updated page table information was referred to. Such an approach would ensure that any write accesses issued whilst the data transfer operation was taking place under software control would be blocked. On completion of the transfer operation, the page tables would again be updated, this time to point to the destination address ranges, and to remove the read only restriction, and again this would require the relevant range of addresses within the TLB structure to be invalidated to ensure that the new updated page table contents were referred to.

TLB invalidations can cause significant performance issues. For example, it is often the case that there will be multiple processing elements in the system, and the TLB invalidation needs to be performed in respect of each such processing element through use of an appropriate broadcast operation. Furthermore, every processing element that then needs to use the range will have to perform a new page table walk process to discover the new translation, and page table walks significantly increase latency for memory accesses that miss in the TLB, since they require multiple dependent page table memory accesses that need to be serialised before the access request can be serviced. Hence, significant performance benefits can be achieved by reducing the number of TLB invalidations required during such a page migration operation.

In one embodiment, upon completion of the transfer operation, the redirect controller is prevented from intercepting a subsequent access request that specifies a target address within the target address range. In the above described embodiments where the at least one destination address range is used as the target address range, it will be noted that at this point no further steps are required, since the page tables will already have been updated to point to the correct address range(s), and accordingly as soon as the interception mechanism of the redirect controller is inhibited, accesses will naturally be directed to the correct location within the physical memory.

In many systems, the processing elements have associated cache structures for caching data accessed in the memory, and a cache coherency protocol is employed to ensure coherency between cached data and the data stored in memory. The cache coherency protocol may then be employed in relation to access requests issued by the data transfer controller during performance of the transfer operation in order to ensure that a most up-to-date version of data specified by said access requests is accessed by the data transfer controller.

The above described data migration operations can lead to inefficient utilisation of cache storage, since it can result in the same data being cached for both the source address range(s) and the destination address range(s). However, in one embodiment the data transfer controller can be arranged so as to free up space within such cache structures whilst the data transfer operation is taking place. In particular, the data transfer controller may be arranged, when issuing read access requests during performance of the transfer operation in order to read the data within said at least one source address range, to employ a specified type of read access request that causes any cached copies of that data to be invalidated during application of the cache coherency protocol.

In one particular embodiment, the specified type of read access request is a read exclusive access request. When such a read exclusive access request is issued, then cache coherency circuitry within the system will perform coherency operations in respect of the relevant cache structures in order to identify the most up to date version of the data (if any cache structure holds a version of the data that is more up to date than the version in memory), with that version of the data being returned to the data transfer controller. Further, the cache coherency protocol will require any cached copies to be invalidated, and accordingly such a process will naturally free up space within any cache structures that have been caching a copy of the data at the source address.

This process can be particularly beneficial in systems where multiple processing elements are provided that each have their own associated cache structure or cache structures, since by taking advantage of the cache coherency protocol rules, multiple of these cache structures may invalidate any copies of the data that they have cached in association with the source address range, hence providing significant benefits with regards to cache utilisation.

The transfer operation performed by the data transfer controller can take a variety of forms, but in one embodiment is employed to perform one of the following type of data transfer: a gather of data from multiple source address ranges into a single destination address range; a scatter of data from a single source address range into multiple destination address ranges; or a transfer of data from a source address range to a same-sized destination address range.

Furthermore, the transfer operation may comprise a move operation or a copy operation. In accordance with a copy operation, the data is copied from the at least one source address range to the at least one destination address range, but the data at the source address range is also retained as valid. In accordance with a move operation, the data is transferred from the at least one source address range to the at least one destination address range, and the data at the at least one source address range is invalidated (for example by issuing separate erase commands if required).

In one embodiment, the above described apparatus may be employed within an interconnect of a system. In particular, a system may be provided that comprises: a plurality of processing elements; and an interconnect coupled to said plurality of processing elements and for controlling access to a memory by said plurality of processing elements; the interconnect having a transfer engine formed by an apparatus in accordance with the above described embodiments, for performing a transfer operation on behalf of one of the processing elements in order to transfer data from at least one source address range to at least one destination address range, whilst enabling access requests issued by the plurality of processing elements in respect of the data that is being subjected to the transfer operation to continue to be processed whilst the transfer operation is being performed.

Hence, the transfer engine provides a hardware mechanism within the interconnect to which the processing elements can offload data transfer requests, with that transfer engine being able to perform the required transfer operation in the background in a manner that is transparent to the software executing on the processing elements. In particular, subsequent access requests issued by any of the processing elements in respect of data that is the subject of the transfer operation can still be processed without waiting for the transfer operation to complete, by interception of such access requests by the redirect controller of the transfer engine, and the performance of the associated memory redirection operation in order to process those access requests.

When the transfer engine is used within the interconnect in the above described manner, it can also be arranged to be responsive to other input signals to control the performance of the transfer operation. For example, the interconnect will have a certain maximum bandwidth, and there will be other traffic being routed through the interconnect at the time the transfer engine is performing the transfer operation. Performance of the transfer operation requires the transfer engine to issue a variety of read and write access requests in order to read data from memory and write data back to memory, and this can impact on the bandwidth available for other processes. However, in one embodiment the transfer engine may be arranged to be responsive to an indication of bandwidth utilisation within the interconnect to throttle performance of the transfer operation. Hence, during busy periods, or periods where latency sensitive operations are being performed, the transfer engine can be arranged to throttle back performance of the transfer operation so as to make less use of the bandwidth, hence freeing up bandwidth for use by other processes. Since the transfer operation is performed as a background task, and does not require subsequent access requests to be blocked, the increase in the time taken to perform the transfer operation when it is throttled back in such a manner does not become problematic. Hence, the described technique provides significantly enhanced flexibility, since the transfer operation can be performed as a background task taking into account the requirements of other processes being performed within the system, and in particular the bandwidth within the interconnect required by such processes.

In one embodiment, a NUMA-type of system may be employed where multiple separate memories are each associated with an interconnect. Accordingly, the system in such an arrangement may further comprise: a further interconnect connected to said interconnect and for controlling access to a further memory by said plurality of processing elements, the further interconnect having a further transfer engine formed by an apparatus as claimed in any preceding claim, for performing a transfer operation on behalf of one of the processing elements in order to transfer data from at least one source address range to at least one destination address range, whilst enabling access requests issued by the plurality of processing elements in respect of the data that is being subjected to the transfer operation to continue to be processed whilst the transfer operation is being performed.

Hence, in such embodiments, a transfer engine will be provided within each interconnect, and hence in association with each memory.

There are a number of ways in which the individual transfer engines can be controlled to perform the required transfer operations. In one embodiment, the transfer engine is employed to handle the transfer operation when the at least one destination address range is within said memory, and the further transfer engine is employed to handle the transfer operation when the at least one destination address range is within said further memory.

Hence, in such an embodiment, the transfer engine associated with the memory that contains the at least one destination address range is used to manage the transfer operation. Even where the at least one source address range is within a different memory, that transfer engine can still perform the transfer operation, via its connection with the other interconnect or interconnects.

Particular embodiments will now be described with reference to the Figures.

FIG. 1 is a block diagram of a system incorporating a data transfer engine 35 in accordance with one embodiment. The system includes the plurality of processing elements 10, 20 that are coupled via an interconnect 30 with a memory 40. Whilst two processing elements are shown for simplicity, it will be appreciated that in any particular embodiment there may be a different number of processing elements coupled to the interconnect.

The processing elements shown employ virtual addressing schemes, and as such virtual addresses will be converted into physical addresses within the memory 40, so that when a processing element issues an access request to seek to access a location in the memory, that access request as forwarded to the interconnect 30 specifies the physical address of the location within the memory to be accessed. In a standard manner, the memory 40 may be organised into a plurality of pages, and page tables 45 may be provided within the memory that contain descriptors used to identify how virtual addresses should be translated into corresponding physical addresses. Each processing element 10, 20 may have an associated translation lookaside buffer (TLB) 15, 25 in which address translation data derived from the page tables 45 can be buffered to improve the speed of virtual to physical address translation. In particular, when a virtual address is issued that does not hit in the TLB, it is necessary to perform a page table walk process with respect to the page tables 45 in memory 40 in order to sequentially traverse through multiple page tables in order to establish the necessary address translation data for that virtual address. Once that address translation data has been determined, it can be buffered within the local TLB.

The address translation data buffered in the TLB will typically identify not only how the virtual address is converted into a physical address, but also any associated permission attributes, such as whether the location is readable and writeable, read-only, cacheable, etc.

During normal operation, one or more of the processing elements may decide that it is appropriate to seek to transfer data from one or more pages in memory to one or more other pages in memory, this process generally being referred to herein as data migration. For example, it may be considered appropriate to merge multiple smaller pages into a larger page (which will be referred to herein as a gather operation), or conversely in some instances it may be considered appropriate to divide a larger page into multiple smaller pages (referred to herein as a scatter operation). Alternatively, it may desirable to move data from one page to another page.

In accordance with the embodiments that will be discussed in more detail herein, the data transfer engine 35 is provided within the interconnect 30 to manage such data migration operations. In particular, the data transfer engine 35 is arranged to be responsive to a data transfer request issued by one of the processing elements 10, 20, to handle the required transfer operation on behalf of that processing element, leaving the processing element free to continue its operations. Furthermore, the data transfer engine includes a redirect controller that is arranged, whilst the transfer operation is being performed, to intercept certain access requests issued by the processing elements 10, 20, in particular access requests that are made in respect of data that is the subject of the transfer operation. For such access requests, the data transfer engine performs a memory redirection operation that enables the access requests to be processed without awaiting completion of the transfer operation. Accordingly, such access requests can be handled asynchronously to the performance of the transfer operation, and hence without needing to block any such access requests. This can give rise to significant performance improvements. Furthermore, the mechanism used by the data transfer engine 30 reduces the number of times that entries in the TLBs 15, 25 need to be invalidated during performance of the transfer operation, as compared with previous known approaches that manage the data transfer process in software under operating system control within one of the processing elements.

The techniques of the described embodiments can be used irrespective of whether processing elements have associated cache structures or not. However, as shown in FIG. 1, the processing elements 10, 20 may each have one or more associated cache structures 50, 55 used to cache data held in the memory 40 in order to improve performance. Cache coherency control circuitry 60 will typically be provided in such instances to ensure that coherency is maintained between the data held in memory and the various copies that may be held within the caches 50, 55. In particular, when an access request is issued from one of the processing elements specifying a physical address in memory 40, the cache coherency control circuitry 60 can determine whether any of the cache structures 50, 55 may hold a copy of the data associated with that physical address, and in that instance snoop circuitry within the cache coherency control circuitry is used to issue snoop requests to the relevant caches in order to identify whether the data is present. By such an approach, it can be ensured that the most up-to-date version of the data is accessed. Depending on the coherency protocol employed, the caches subjected to the snoop operations may return data to the cache coherency control circuitry 60 when it is determined that the data associated with the address specified by the snoop request is held within the cache and/or may cause a copy of any such data to be invalidated within the cache. In addition to such actions being dependent on the coherency protocol used, they can also depend on the type of access request issued by the processing elements 10, 20.

In one embodiment, as will be discussed later, when the data transfer engine 35 is performing a transfer operation to move a block of data from one or more source pages to one or more destination pages within the memory 40, it will issue a series of read access requests and write access requests in order to read the required data to be moved, and then write that data to the destination pages. The access requests issued by the data transfer engine 35 will be reviewed by the cache coherency control circuitry 60 in the same way as access requests issued by the processing elements 10, 20. By using a specific form of read access request, this can ensure that any cached copies of the data that is being moved, that are associated in the caches 50, 55 with the source address range(s), are invalidated, hence freeing up resources within the cache. It will be appreciated that once the transfer operation has been performed, the data will reside within the destination page(s), having the associated destination address range(s), and hence any cache copies associated with the source address range will not be used. Thus, by invalidating those copies during the data transfer process, this can provide a very efficient mechanism for removing redundant data from the caches 50, 55.

Figure 2:
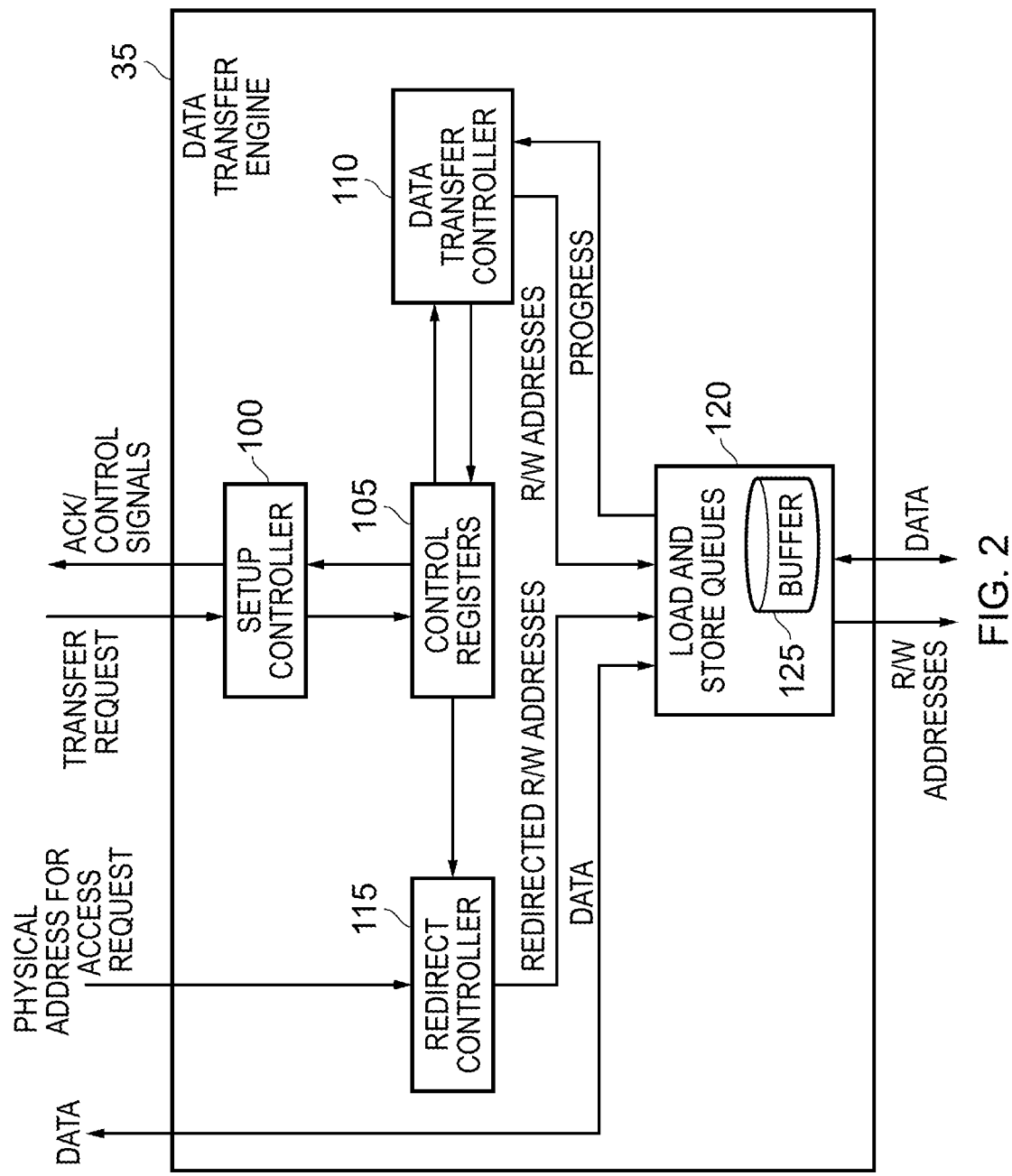
FIG. 2 is a block diagram illustrating in more detail the data transfer engine of FIG. 1 in accordance with one embodiment.

FIG. 2 is a block diagram illustrating the data transfer engine 35 of FIG. 1 in more detail, in accordance with one embodiment. A setup controller 100 is provided that is arranged to receive data transfer requests from the processing elements 10, 20. Upon receipt of a data transfer request, the setup controller populates certain information within the control registers 105, this information providing details about the one or more source address ranges from which the data is to be transferred, and the one or more destination address ranges to which the data is to be transferred. Typically the source address range(s) and the destination address range(s) will be specified by the transfer request issued from the processing element, and that information is extracted from the request and populated within one or more control registers. Additional information can also be specified, for example identifying whether the transfer should implement a copy (where after the data has been moved, the data still remains valid within the source address region(s)) or a move (where after the data has been transferred, the data within the source address region(s) is invalidated). The transfer request can also specify certain other information, for example whether the earlier-mentioned particular form of read access request should be used in order to assist in clearing redundant information from the caches.

Once the relevant information has been populated within the control registers 105, the setup controller can issue an acknowledgement signal back to the processing element, this acknowledgement signal being one example form of a control signal that can be issued from the setup controller. In particular, in one embodiment the processing element is responsive to receipt of the acknowledgement signal to undertake steps to update the relevant page tables 45, so as to ensure that whilst the transfer operation is being performed by the data transfer engine 35, any virtual addresses within the relevant virtual address range will be mapped to target addresses within a particular target address range that will then be intercepted by the data transfer engine. In one particular example embodiment, the processing element may be arranged to modify the appropriate page tables so that such virtual addresses will be mapped to addresses within the one or more destination address ranges rather than continue to be mapped to addresses within the one or more source address ranges. As will be discussed in more detail later, the redirect controller 115 within the data transfer engine can then intercept any access requests issued to addresses within the one or more destination address ranges whilst the data transfer operation is being performed, and perform a memory redirection operation in respect of such access requests.

In addition to updating the page tables, the processing element may also invalidate any relevant entries within its local TLB, i.e. entries that provide address translation data for the relevant range of virtual addresses, and also will typically broadcast a message to the other processing elements to cause them to also invalidate such entries in their local TLBs. By invalidating the relevant contents in the TLB, this ensures that if an access request is issued by any of those processing elements using a virtual address within the relevant virtual address range, a hit will not be detected in the TLB, and will cause a page table walk process to be employed, as a result of which the new mapping provided in the updated page tables 45 will be retrieved, and used to convert the virtual address into a physical address. That new address translation data can then be buffered within the TLB if desired.

As an alternative to using such an acknowledgement signal to the processing element to cause the processing element to undertake the page table update process and the TLB invalidation process, the setup controller may directly issue control signals to the memory to update the page tables 45, and further may issue one or more control signals to cause relevant entries in the TLBs of the processing elements 10, 20 to be invalidated.

Once such steps have been taken, a data transfer controller 110 within the data transfer engine 35 can be activated to begin performance of the transfer operation, using the information held in the control registers to determine the source addresses from which to read the data and the destination addresses to which that data should then be written in order to perform the required data migration within the memory 40. The redirect controller 115 will typically be activated at the same time, so that during the period that the data transfer controller 110 is performing the transfer operation, the redirect controller 115 monitors access requests issued by any of the processing elements 10, 20 in order to detect situations where those access requests specify addresses within a target address range. In accordance with the earlier example where the page tables are updated prior to the transfer operation taking place so as to ensure that the relevant virtual addresses map to physical addresses within the one or more destination address ranges, the redirect controller can monitor for access requests that specify a physical address within the one or more destination address ranges, and on detection of such an access request will intercept that access request and perform a memory redirection operation. The memory redirection operation will be discussed in more detail later, but aims to ensure that the access request can be processed whilst the transfer operation is in progress, whilst ensuring that the data remains consistent.

As shown in FIG. 2, the redirect controller 115 will hence generate redirected read or write addresses in response to the read or write addresses that it intercepts. Some of the redirected read or write addresses may in fact be the same addresses as were received, for example in some instances for an intercepted access request it may be decided that the redirected address can remain the same as the specified address of the access request.

The redirected addresses are forwarded to the load and store queues 120, and the associated read or write data is also routed through the load and store queues as shown in FIG. 2. As also shown in FIG. 2, the data path does not need to be intercepted by the redirect controller 115.

There are a number of ways in which access requests that are not intercepted by the redirect controller can be processed. In some embodiments, such access requests will not even be reviewed by the redirect controller, since the interconnect will not route such access requests to the data transfer engine. Alternatively, in some embodiments the redirect controller may review each access request, but for any access request that it is determined does not need to be intercepted, that access request could be arranged to bypass the load and store queues 120 since such an access request will not conflict with the address ranges that are the subject of data transfer operations by the data transfer engine. In this latter case, a separate set of ports could be provided to which the redirect controller could then transfer any access requests that it has determined do not need to be intercepted.

In the embodiments shown in FIG. 2, the load and store queues 120 are shared between the redirect controller 115 and the data transfer controller 110. Hence, the data transfer controller will issue a series of read and write addresses to the load and store queues 110 in order to cause the required data to be read from the source addresses, and then written to the required write addresses. As shown in FIG. 2, the load and store queues 120 may maintain one or more buffers 125 in which the data read from memory during performance of the transfer operation can be temporarily buffered before it is written back to memory. Hence the data itself does not need to be returned to the data transfer controller 170, but instead progress information about the progress being made with respect to the various read and write requests can be forwarded back to the data transfer controller, which in one embodiment also populates information within the control registers 105 to indicate the progress being made. For certain types of memory redirection operation, that progress information within the control registers may be referred to by the redirect controller 115 when deciding how to redirect a received physical address of an intercepted access request.

By using the load and store queue structures 120 for both the access requests selectively modified by the redirect controller, and the access requests issued by the data transfer controller when performing the transfer operation, any potential race conditions can be detected and addressed within the load and store queues. There are a number of ways in which the load and store queues structure 120 can be arranged to detect and address such race conditions. For example, in one embodiment the data transfer controller 110 can be arranged, prior to issuing a read request to a source address, to reserve a placeholder write request (without any data) to the destination address in an entry of the load and store queue structure 120. This entry can be used to delay conflicting accesses until the transfer operation is completed. The data transfer controller can then update the progress state within the control registers 105, and issue a read access request for the source address. Once the read response arrives from memory, the data transfer controller can then issue a real write request that updates the placeholder request reserved earlier. At this point, the load and store queues structure 120 can then forward the write request to memory. By adopting such a sequence, this ensures that any redirected read or write request that overlaps with an address specified in a placeholder write entry in the load and store queues is delayed until the entry is promoted to a "real" write after the read data has been obtained from memory.

Such an approach can also provide some efficiency benefits in the way in which access requests are processed. By way of example, if a write access request is issued to an address within the destination address range, and the redirect controller determines that it is appropriate to propagate that write to the destination address, but this overlaps with the data transfer controller performing a transfer in respect of the destination address, then once it is determined that the required data has been read from the source address, but has not yet been written out to memory, the new write data from the access request can be merged into the write data in the buffer 125, so that the updated write data is output to memory.

Figure 3:
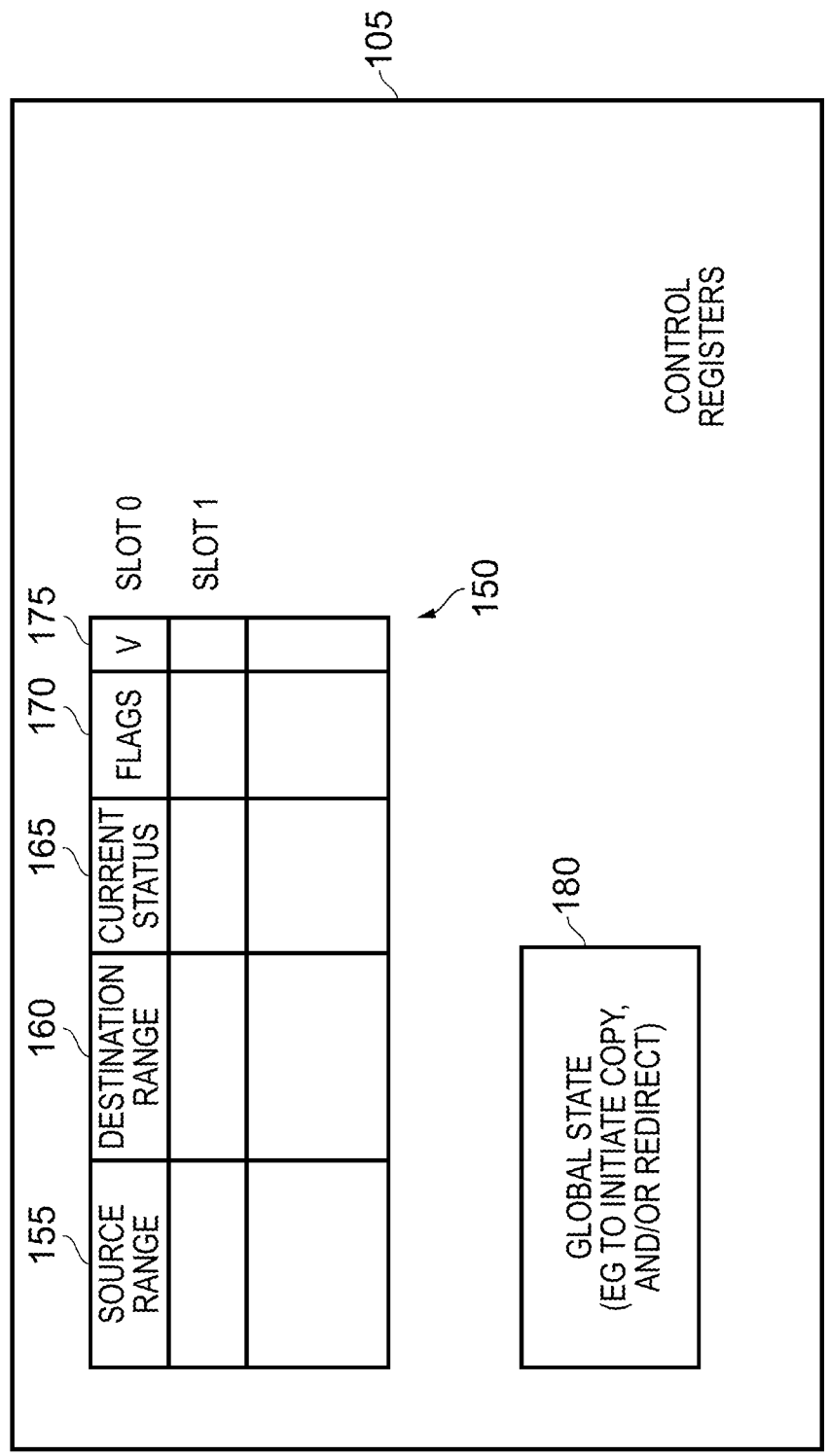
FIG. 3 schematically illustrates information that may be retained within the control registers of FIG. 2 in accordance with one embodiment.

FIG. 3 illustrates an example arrangement of information within the control registers 105 in accordance with one embodiment. In accordance with this embodiment a plurality of slots 150 may be provided, with each slot comprising a number of fields. A first field 155 is used to identify a source range, whilst the field 160 is then used to identify a corresponding destination range. A field 165 may optionally be provided to identify the current status of the data transfer being performed in respect of that source and destination range, whilst a flag field 170 may also be provided to store additional information if required. As one example of such flag information, a flag may be set to identify whether read access requests associated with the data transfer should be issued as read exclusive requests, so as to cause invalidation of any cached copies within the cache structures 50, 55 that are associated with the source address range. Finally, a valid flag 175 may be provided, that can be set to identify whether the slot contains information for a valid data transfer that has yet to be completed.

In one embodiment, each of the slots is arranged to accommodate information about a contiguous address range of a particular size, for example the smallest possible page size. By arranging the slots in this way, this can simplify the address comparator logic used by the redirect controller 115 when determining whether an access request specifies an address that is within a range of a valid slot. However, in an alternative embodiment it may be possible to reconfigure the size of the address range associated with each slot, in which instance a global size field may be provided within the global state information 180 to identify the size information.

Hence, purely by way of illustration, if a gather data migration operation is performed to merge two pages of the minimum page size into one larger destination page, two separate slots may be propagated, the first covering the source address range of the first source page and the second covering the source address range of the second source page. The destination address range associated with the larger destination page will then be split into two sub-ranges, the first sub-range being stored within the first slot and the second sub-range being stored within the second slot.

Additional global state 180 may also be provided if desired. For example, a global state flag can be set when the setup controller 100 determines that the data transfer controller can begin to perform the transfer operation. In particular, as discussed earlier, there are certain setup steps that need to be completed before the transfer begins. In addition to setting up the contents of the control registers, the setup controller may additionally await confirmation from the processing element that any relevant page table updates and any TLB invalidations have been performed, before setting the global state flag to allow the data transfer controller 110 to begin the transfer operation. A similar redirect enable flag can also be provided for the redirect controller 115 if desired. Typically the redirect controller will be enabled so that it performs any required redirection for access requests issued while the data transfer controller is actively handling the transfer operation, but may also need to perform redirection for a period either before the transfer operation begins or after the transfer operation completes, depending on the target address range used by the redirect controller when determining which access requests to intercept. For example, in cases where the redirect controller has been set up to intercept addresses within the destination address range, redirection will in one embodiment be enabled before updating the page table and subsequently starting the transfer operation. Conversely, when the redirect controller has been set up to intercept addresses within the source address range, the redirect controller will in one embodiment remain enabled until after the transfer operation has completed and the page table has then been updated.

As an alternative to providing a separate redirect enable flag within the global state 180, the valid flags 175 may for example be used to determine when the redirect controller should be enabled. In such a case, redirection would always be enabled whilst there are pending copy operations to be performed.

Figure 4A:
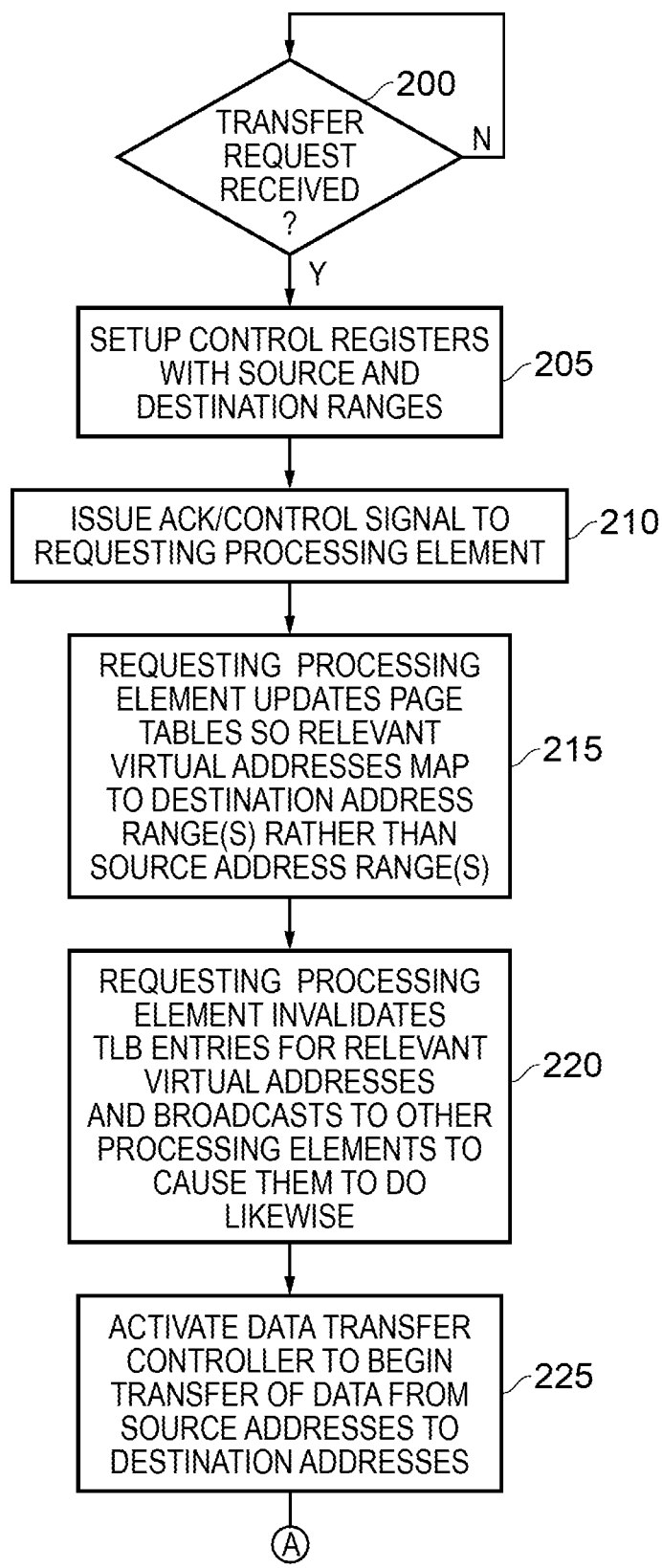
FIGS. 4A and 4B are flow diagrams illustrating steps performed within the system of FIG. 1 in accordance with one embodiment in order to transfer data from at least one source address range in memory to at least one destination address range in memory.
Figure 4B:
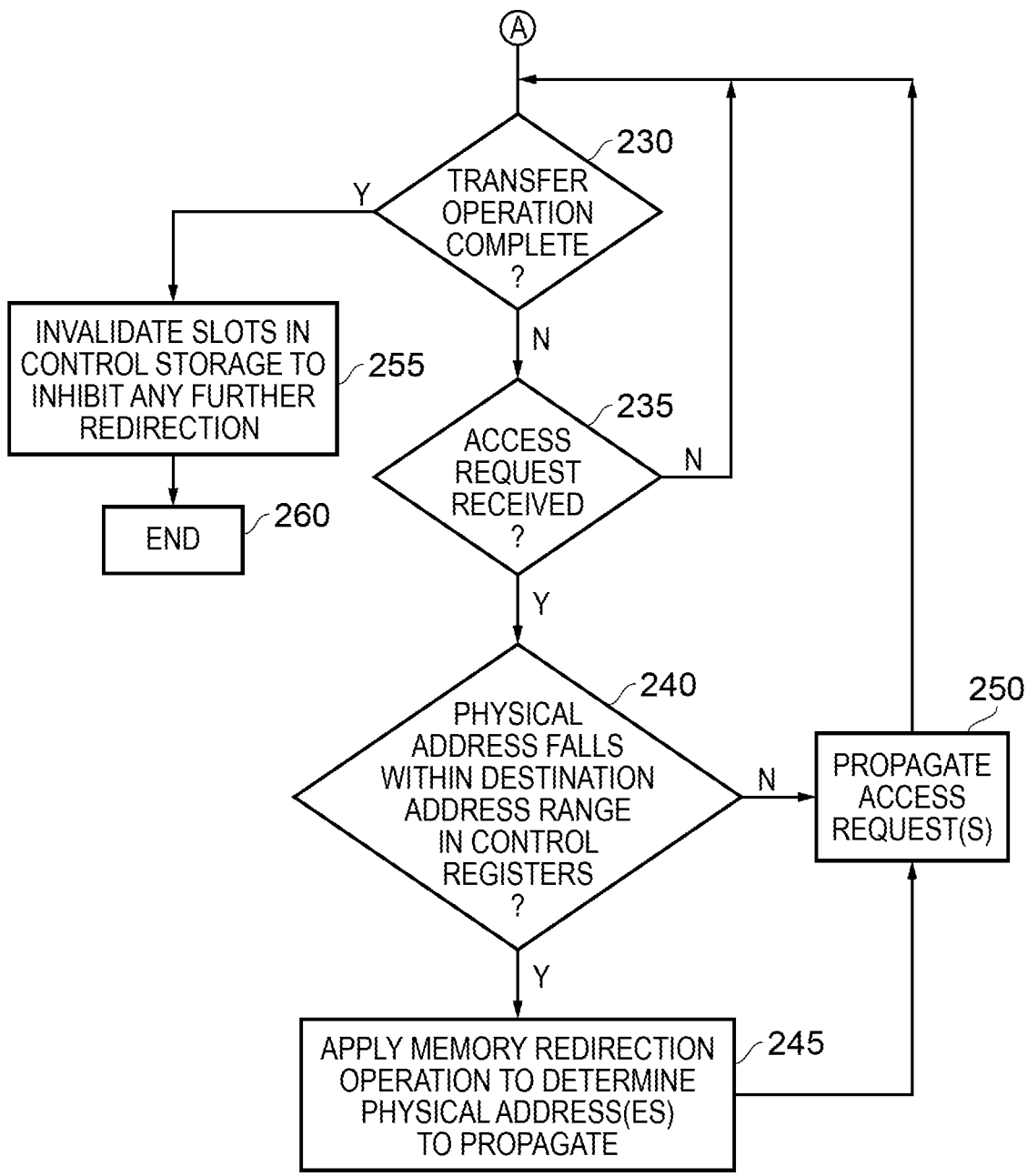

FIGS. 4A and 4B provide a flow diagram illustrating the operation of the system of FIG. 1 in accordance with one embodiment, in order to implement a data transfer within the memory 40. At step 200, the data transfer engine 35 determines whether a new transfer request has been received. When a new transfer request has been received, then at step 205 the control registers 105 are populated with the source and destination address ranges and any other associated information, as discussed earlier.

In one embodiment, the data transfer engine may be arranged so that it will not accept a new transfer request whilst another transfer request is already pending. In one embodiment, the system software would be arranged to ensure that transfer operations are serialised to avoid such a situation arising, but in an alternative embodiment the data transfer engine may be arranged to not accept a transfer request presented at its input whilst another transfer request is pending.

Once the control registers have been populated, then at step 210 the setup controller issues an acknowledgement signal back to the requesting processing element. At step 215 the requesting processing element then updates the page tables 45 so that the relevant virtual addresses map to the destination address range(s) rather than the source address range(s). In particular, in this embodiment it is assumed that the target address range is chosen to be the destination address range(s) and that it is access requests that specify addresses within the destination address range(s) that will be intercepted by the redirect controller. However, in other embodiments, as discussed earlier, the target address range may instead be the source address range(s) in which event the page tables will not be updated prior to the transfer operation being performed, but instead will be updated afterwards.

In some embodiments, the data transfer engine may determine the target address range to be used having regards to the type of migration being performed. For example, for a gather operation where multiple discontiguous source address ranges are being merged into a contiguous larger destination address range, it may be beneficial to use the contiguous destination address range as the target address range, as by using one contiguous range this makes the address matching circuitry employed by the redirect controller to determine whether an access request should be intercepted significantly simpler. Conversely, if a scatter operation is being performed to scatter data from a contiguous source address range to multiple discontiguous destination address ranges, it may be preferable to use the single contiguous source address range as the target address range.

Returning to FIG. 4A, at step 220 the processing element invalidates any TLB entries that it has for the relevant virtual addresses, and also broadcasts a message to the other processing elements to be likewise. Again, this assumes that the destination address range(s) is being used as the target address range. In an embodiment where the source address range(s) is being used as the target address range, then the TLB entries will not be invalidated prior to the transfer operation being performed, but instead will be invalidated after the transfer operation has completed.

Following steps 215 and 220, then the process proceeds to step 225 where the data transfer controller is activated to begin transfer of data from the source addresses to the destination addresses.

As then shown in FIG. 4B, it is determined at step 230 whether the transfer operation is complete, and whilst the transfer operation is not complete, the process proceeds to step 235, where it is determined whether a new access request has been received by the redirect controller 115. The process loops at steps 230 and 235 until either the transfer operation completes, or an access request is received.

When an access request is received, the redirect controller then determines at step 240 whether the physical address specified by the access request falls within the destination address range identified within the control registers. If not, then the access request is merely propagated on towards the memory system 40 in the usual way at step 250.

However, if the physical address does fall within the destination address range in the control registers then the redirect controller 115 applies a memory redirection operation at step 245 in order to determine the appropriate physical address, or physical addresses, to propagate. As will for example be discussed later with reference to FIG. 5A, in accordance with one embodiment of the memory redirection operation, when write access requests are received, the memory redirection operation may cause a write to be performed to both the source address and the corresponding destination address, effectively causing two access requests to be created at step 245 prior to the process proceeding to step 250.

Following propagation of the access request or access requests to the load and store queues 120 at step 250, the process returns to step 230.

Once it is determined at step 230 that the transfer operation is complete, then the process proceeds to step 255, where the relevant slot or slots in the control storage are invalidated and any further redirection is then inhibited. By turning off the redirect functionality of the redirect controller 115, this means that any subsequent access requests issued to addresses within the destination address range will directly access the correct addresses in memory. No further action is required as the page tables will already previously have been updated at step 215 to identify the correct mapping to be used after the data transfer has been completed.

Figure 5A:
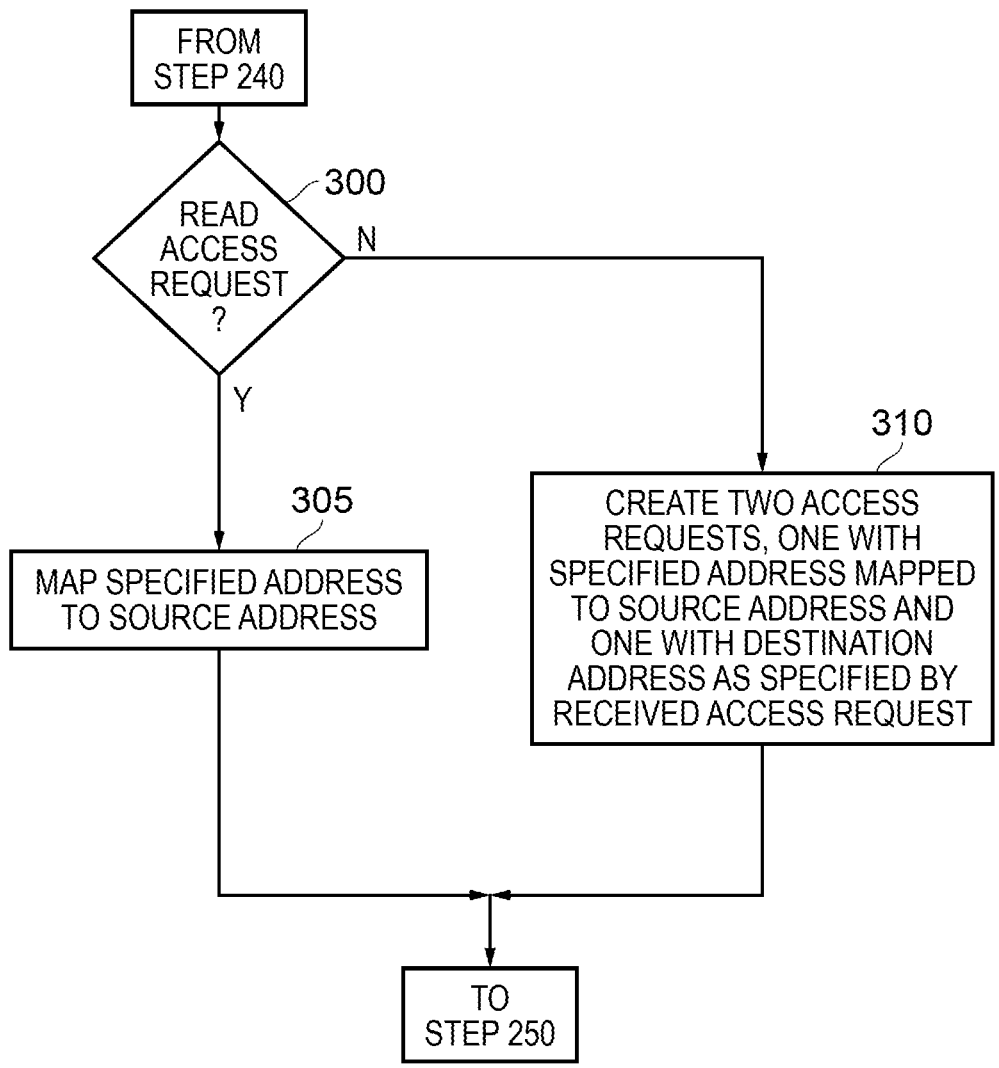
FIGS. 5A, 5B and 5C are flow diagrams illustrating three different mechanisms that may be used to implement step 245 of FIG. 4B.

The memory redirection operation performed at step 245 can be implemented in a variety of ways. FIG. 5A illustrates one example embodiment. At step 300, it is determined whether the access request is a read request, and if it is the specified address provided by the access request is mapped to a corresponding source address within the source address range(s). Thereafter the process then proceeds to step 250 of FIG. 4B.

However, if the access request is not a read access request, i.e. it is a write access request, the process proceeds to step 310 where application of the memory redirection operation causes two access requests to effectively be created. One access request has a specified address that is mapped to the source address, whilst the other uses the destination address as specified by the access request received at step 235. This hence ensures that write operations occur to both the old address and the new address, and hence ensures that the original version and the copy stay in sync. Whilst it does duplicate write operations, the overhead of this approach is likely to be low if the source and destination ranges that are the subject of the data transfer operation are not used heavily during the period that the data transfer operation is performed. Following step 310, the process then proceeds to step 250 of FIG. 4B.

Figure 5B:
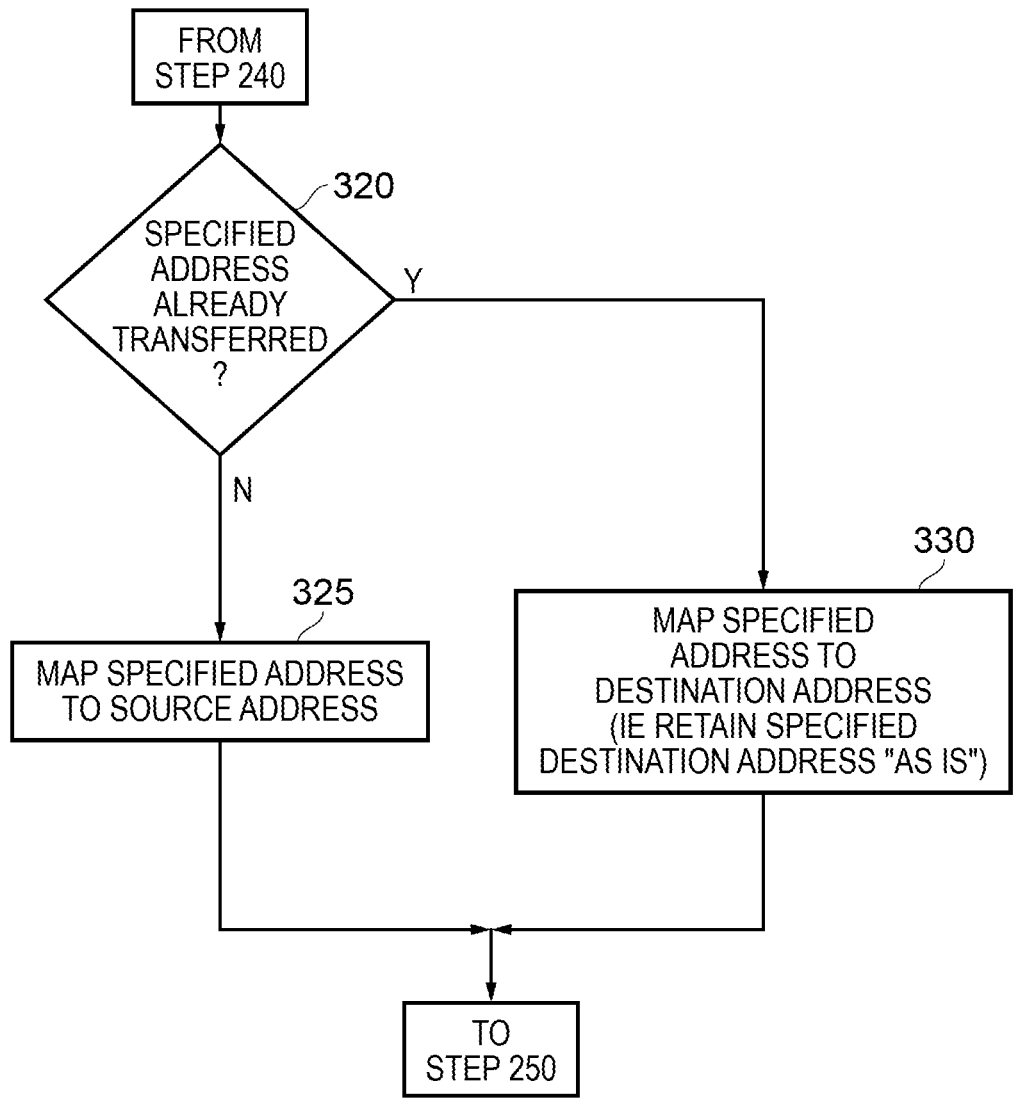

FIG. 5B illustrates an alternative embodiment for performing a memory redirection operation at step 245 of FIG. 4B. At step 320, it is determined by the redirect controller 115 whether the data at the specified address of the access request has already been transferred. As discussed earlier, in one embodiment this determination can be made by the redirect controller 115 with reference to the contents of the control registers 105, and for example by looking at the current status field 165 within the relevant slot. If the specified address has already been transferred, then the process proceeds to step 330 where the specified address is mapped to the destination address. In the embodiment described in FIGS. 4A and 4B, the specified address is already the destination address, hence at step 330 that destination address is merely retained as the address of the access request that is propagated at step 250.

However, if the specified address has not yet been transferred, the specified address is mapped to the source address at step 325 prior to proceeding to step 250. Hence, in accordance with this embodiment, the redirect controller forwards accesses to locations that have not yet been copied to the source location and accesses to copied locations to the destination location. Assuming that the data transfer operation is performed sequentially with respect to the addresses within the address range, only a small amount of state is required to keep track of which locations have been copied and which have not.

Figure 5C:
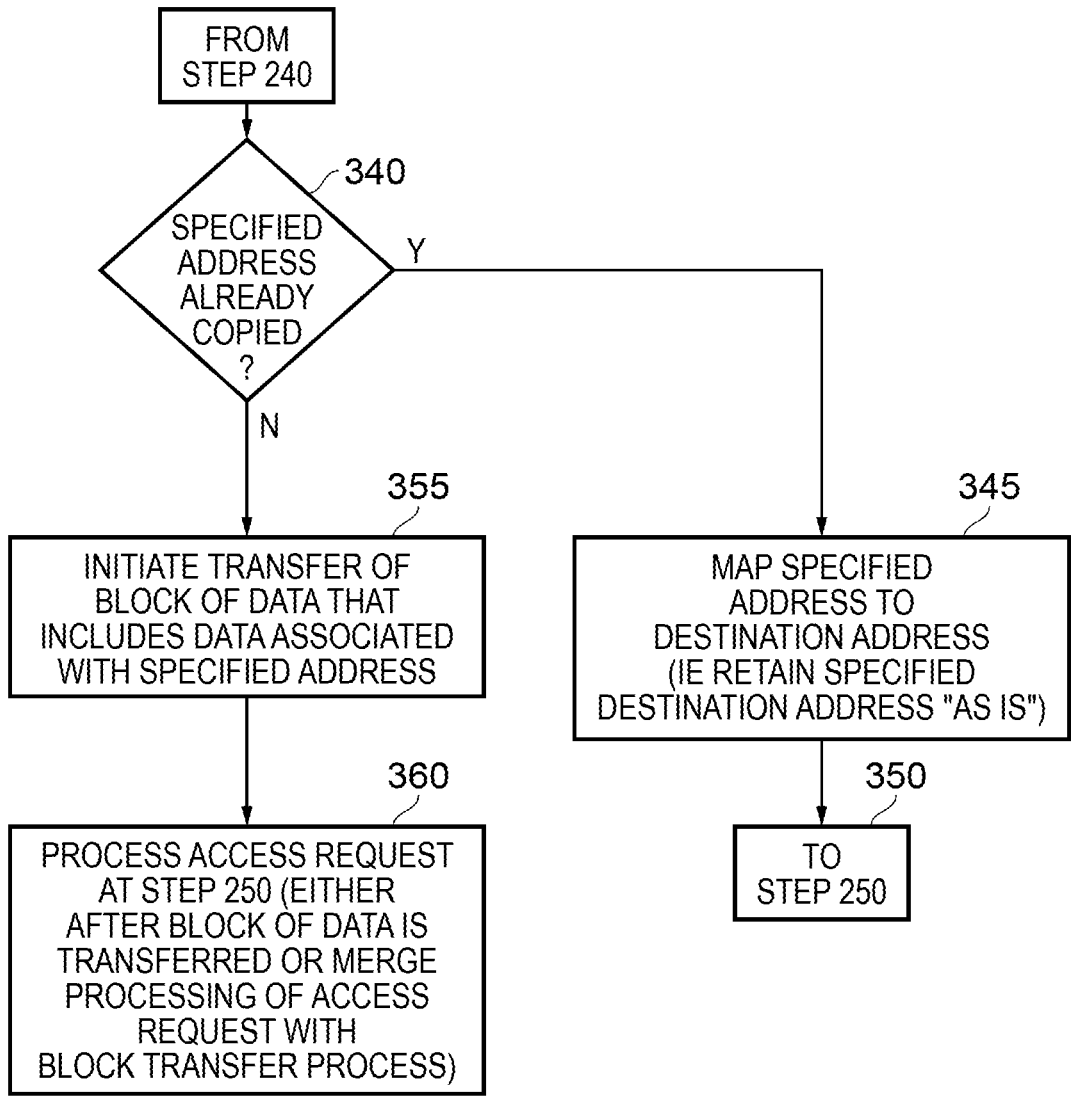

FIG. 5C illustrates a yet further alternative embodiment for implementing the memory redirection operation at step 245 of FIG. 4B. At step 340, it is determined whether the specified address has already been copied, and if so the process proceeds to step 345, which is equivalent to step 330 of the earlier discussed FIG. 5B. The process then proceeds to step 250 at step 350 of FIG. 5C.

However, if the specified address has not yet been copied, then at step 355 the redirect controller 115 contacts the data transfer controller 110 to initiate transfer of a block of data that includes the data associated with the specified address of the access request. The size of the block of data transferred can vary dependent on implementation, but in one embodiment is a cache-line sized block of data, and the data transfer engine maintains within the control registers 105 a bitmap of copied cache-line sized blocks of data in order to identify which blocks have been copied and which have not.

The process then proceeds to step 360 where the access request is processed at step 250. The access request can be processed in a variety of ways. For example, in one embodiment, the access request may be temporarily halted until the transfer of the block of data initiated at step 355 has completed, and the bitmap of copied cache line sized blocks has been updated. At that point, the access request may then be processed by implementing a step equivalent to step 345 in order to propagate the access request to the destination address.

However, in an alternative embodiment further efficiency savings may be achieved by effectively merging the processing of the access request with the block transfer process. For example, in the event of a read access request, once the data transfer controller 110 has read the necessary data back to the buffer 125 of the load and store queues 120, the read access request can then be serviced using the contents within the buffer rather than needing to issue a separate read access request to memory. Similarly, if the access request is a write access request, once the data has been read by the data transfer controller 110 into the buffer 125, the new write data from the write access request can be merged into that block of data, prior to the data in the buffer being written out to the destination memory locations in order to complete the transfer of the block of data.

Figure 6A:
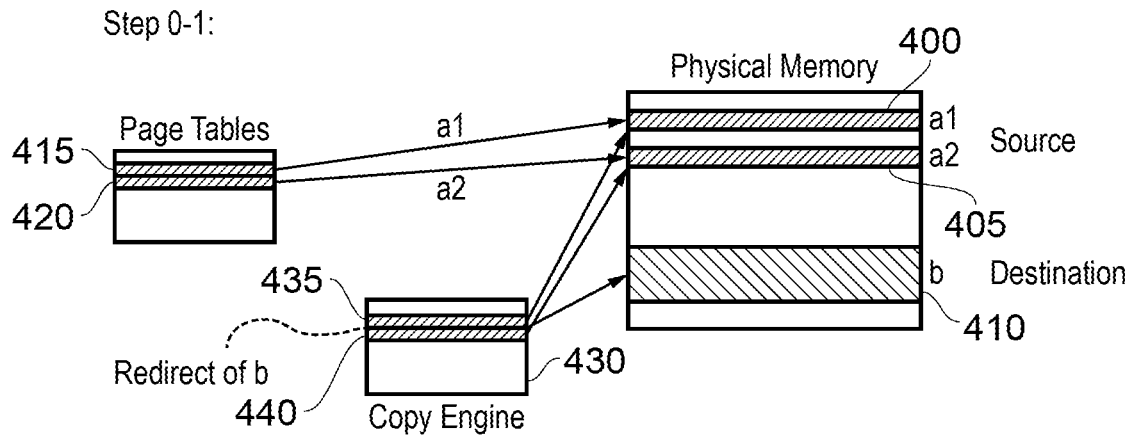
FIGS. 6A to 6C schematically illustrate use of the data transfer engine of one embodiment (referred to in these figures as a copy engine) for an example situation where two source address ranges are merged into a single, larger, destination address range.
Figure 6B:
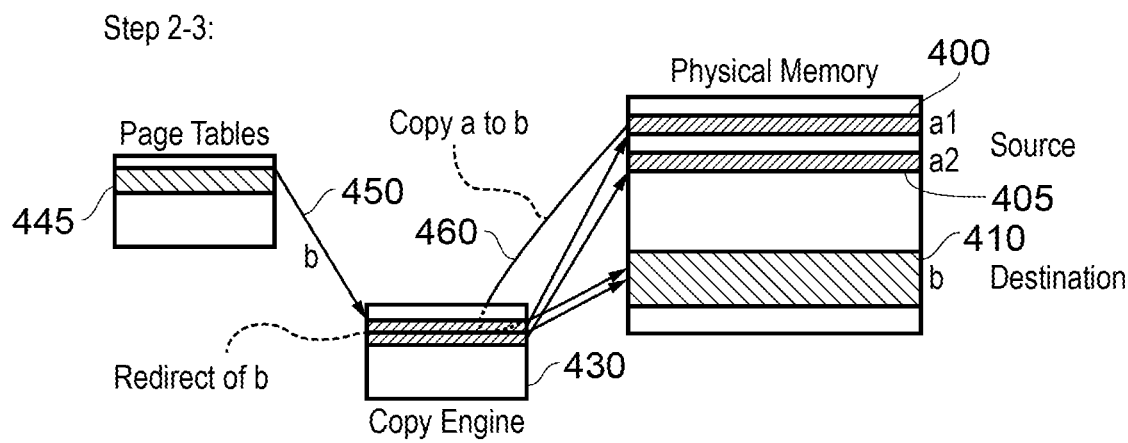
Figure 6C:
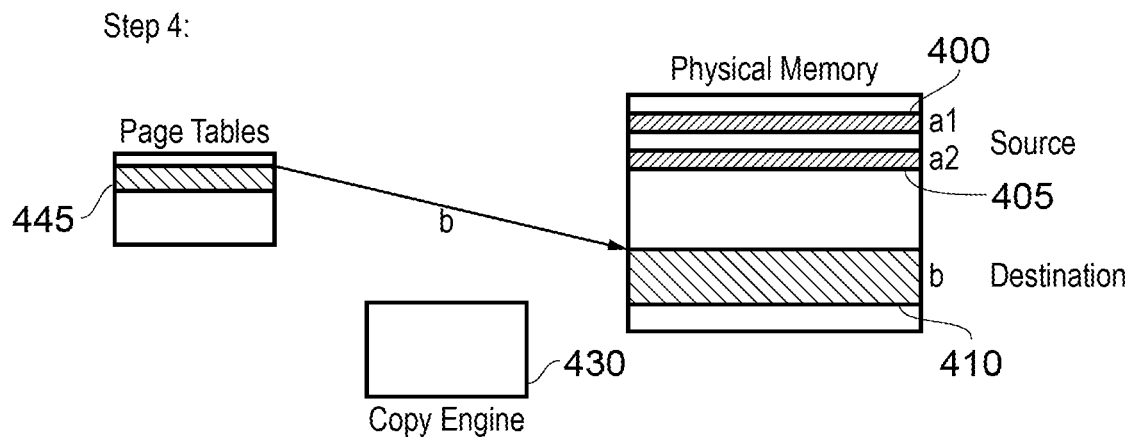

FIGS. 6A to 6C schematically illustrate an example implementation of the process of FIGS. 4A and 4B for the example where two smaller source pages a1, a2 400, 405 are merged into a larger destination page b 410 within the physical memory. The entries 415, 420 schematically illustrate the relevant descriptor information within the page tables that causes virtual to physical address translation to map to the respective source address regions 400, 405. As illustrated in FIG. 6A, the adjacent entries 415, 420 illustrate that the two source regions 400, 405 have adjacent virtual address ranges, and the purpose of the data transfer operation is to remap the discontiguous physical pages 400, 405 into a contiguous physical address range 410. The copy engine is schematically illustrated by the block 430, and the entries 435, 440 represent the control information stored within two slots within the control registers 105, each slot identifying one of the source address ranges and a corresponding portion of the destination address range.

Accordingly, after the control register information has been saved, the copy engine knows the source ranges 400, 405 and the destination range 410. At this point, the functions of the data transfer controller 110 and redirect controller 115 can be activated to begin the data transfer operation, and the redirection control. As illustrated in FIG. 6B, and as discussed earlier with reference to step 215 of FIG. 4A, the page tables will be updated to create a new entry 445 that maps the enlarged contiguous range of virtual addresses to corresponding physical addresses within the destination address range 410. As mentioned earlier with reference to step 220 of FIG. 4A, relevant TLB entries will also be invalidated so that any access requests that are subsequently issued whilst the data transfer operation is being performed, and which relate to the data being transferred, will cause the page table walk process to be performed in order to obtain the address translation data encapsulated within the descriptors of the page tables represented by the entry 445.

As shown by the line 450, any access requests issued specifying a destination address within the destination address range 410 will be intercepted by the copy engine 430. The copy engine will then perform the memory redirection operation in order to determine which physical addresses are accessed, using any of the approaches of FIGS. 5A to 5C discussed earlier. At the same time, the copy process will be performed by the copy engine, as indicated schematically by the arrow 460. In one embodiment, read exclusive accesses are used for the read operations performed in respect of the source address range, with write accesses then being used to store the results to the new destination address range 410. The use of read exclusive accesses invalidates cached copies of the data associated with the old source address range, and hence effectively frees up cache space.

As shown in FIG. 6C, once the copy operation has been completed, the mapping within the copy engine is teared down, invalidating the relevant control information in the control registers. This stops any further interception of access requests issued to destination addresses within the destination address range. Instead, such access requests are just routed in the normal way to the destination address range, given that the page tables already contain the correct information to provide that mapping.

In the example of FIGS. 6A to 6C it is assumed that the destination address range is used as the target address range during the copy process, and hence it is addresses within the destination address range that are intercepted by the copy engine during the copy process. As discussed earlier, in an alternative embodiment the source address range(s) could instead be used as the target address range, in which event the page tables would not be updated, and the TLB entries would not be invalidated, until after the copy process had been completed.

Figure 7:
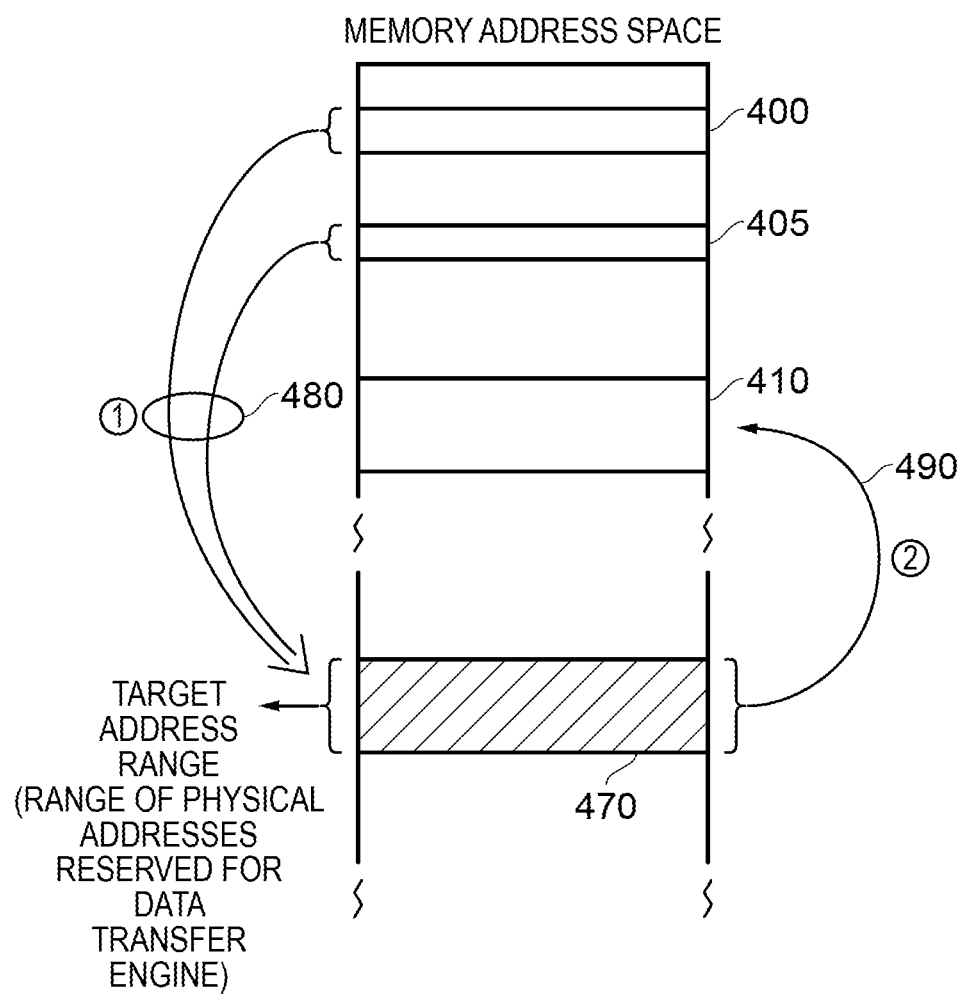
FIG. 7 schematically illustrates how a reserved range of addresses within the memory address space may be associated with the data transfer engine in accordance with one embodiment.

In a yet further alternative embodiment, as discussed earlier, a dedicated address range may be associated with the copy engine 430, and this process is illustrated schematically in FIG. 7, again for the example where two source address ranges 400, 405 are merged into a destination address range 410 within the memory address space. As shown in FIG. 7, a dedicated address range 470 is associated with the copy engine, and is not used for any other purpose. In accordance with this embodiment, when the page tables are updated prior to the start of the copy operation, they change the mapping as indicated by step 1 480 in FIG. 7, so that the relevant virtual addresses map to the dedicated address range 470 rather than to the source address ranges 400, 405. Otherwise, the process continues as shown in FIGS. 6A and 6B, with any accesses directed to the address range 470 being intercepted by the redirect controller and mapped to the source address ranges 400, 405 or the destination address range 410 dependent on the criteria discussed earlier with reference to FIGS. 5A to 5C. On completion of the copy operation, the page tables are then again updated so as to change the mappings of the virtual addresses so that they now map to the destination address range 410 rather than the dedicated address range 470, as indicated by step 2 490.

Figure 8:
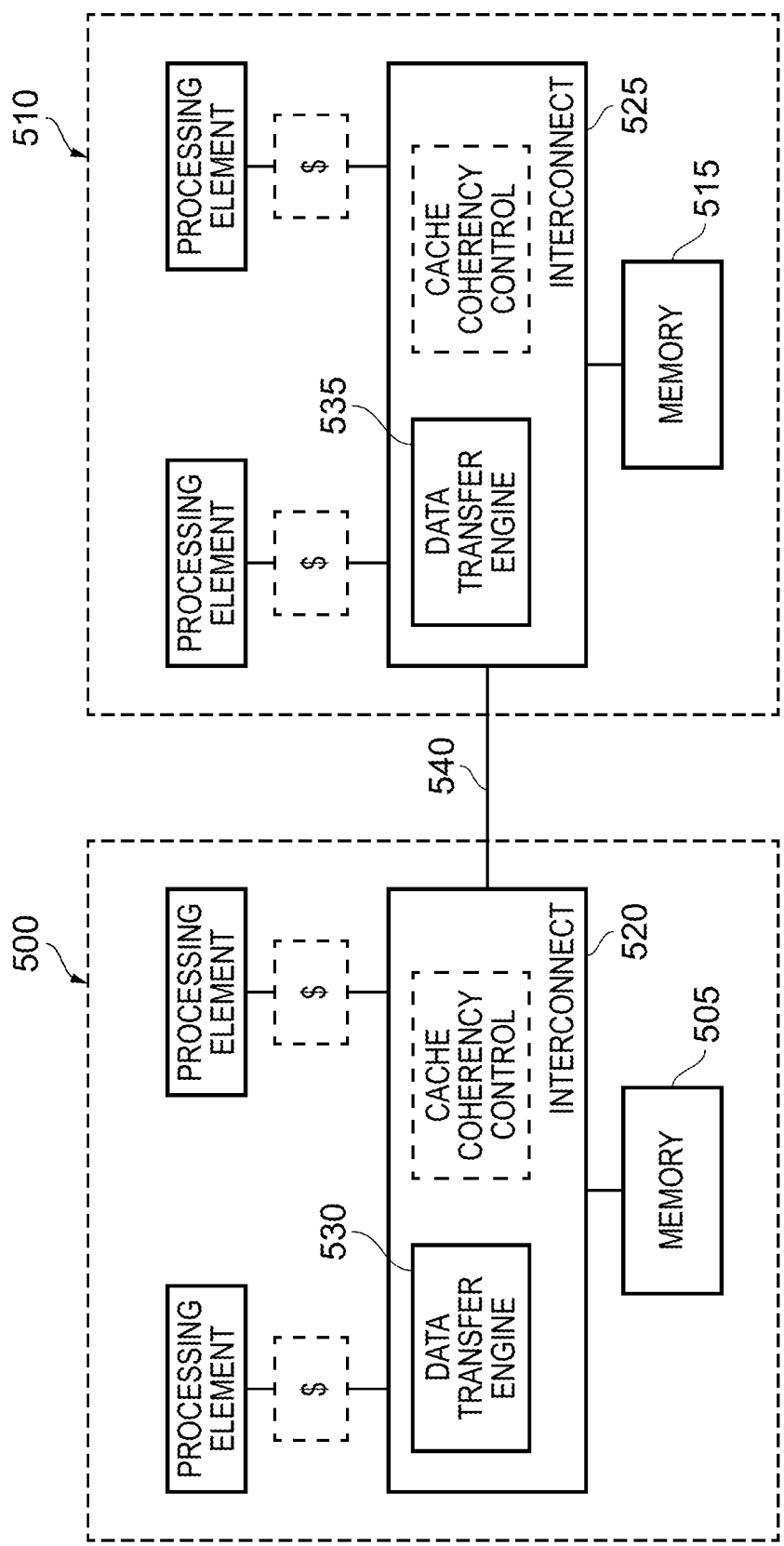
FIG. 8 illustrates a system in accordance with an alternative embodiment, where a non-uniform memory access (NUMA) configuration is used, and multiple data transfer engines are provided to manage data transfer operations.

Whilst the embodiment described with reference to FIG. 1 shows a uniform memory access (UMA) system, the techniques can also be applied in respect of non-uniform memory access (NUMA) systems, an example of which is shown in FIG. 8. In this example, the NUMA system has two NUMA nodes 500, 510, each of which for the sake of illustration is assumed to have a structure similar to that shown in FIG. 1. Each NUMA node 500, 510 has its own associated memory 505, 515 which is coupled to a corresponding interconnect 520, 525. In accordance with the described embodiments, each interconnect has its own data transfer engine 530, 535, and the two interconnects 520, 525 are connected via the path 540. In such an arrangement, any of the processing elements within either of the NUMA nodes 500, 510 can be arranged to access data in either of the separate memories 505, 515.

When a data transfer request is issued by one of the processing elements, one of the data transfer engines 530, 535 will take responsibility for performing that data transfer and setting up its control registers accordingly. In one embodiment, where the destination address range(s) is used as the target address range during the copy process, the data transfer engine associated with the memory containing the destination address range(s) will typically be configured to handle the data transfer process. However, in embodiments where the source address range(s) is used as the target address range during the data transfer process, then it may be appropriate to arrange for the data transfer engine associated with the memory containing the source address range(s) to be responsible for handling the data transfer operation. If the embodiment discussed earlier with reference to FIG. 7 is used where a dedicated memory address range is associated with each data transfer engine, then either of the data transfer engines could be configured to handle any particular data transfer process, irrespective of which memory contains the source address region(s) and which memory contains the destination address region(s).

From the above described embodiments, it will be seen that such embodiments provide a hardware mechanism that can be used to handle data migration operations in physical memory. The hardware mechanism employed enables the data transfer operation to proceed asynchronously with regards to any access requests that seek to access the affected address regions, avoiding the need to block any such accesses, and hence improving performance. The proposed mechanism can also reduce the number of TLB invalidations required during the data transfer process, when compared with known systems that perform such page migration under software control using the operating system of the processing element. Further, the proposed techniques can also improve cache utilisation by ensuring that information no longer required in the caches is invalidated during the data transfer process.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:
1. An apparatus, comprising:
 a data transfer controller, responsive to a data transfer request received by the apparatus from a processing element, to perform a transfer operation to transfer data from at least one source address range in memory to at least one destination address range in the memory; and a redirect controller arranged, while the transfer operation is being performed, to intercept an access request that specifies a physical target address within a target address range, and to perform a memory redirection operation to redirect the physical target address to at least one of a physical address within the at least one source address range and a physical address within the at least one destination address range dependent on the access request;

wherein:

the processing element is arranged to implement address translation of virtual addresses to corresponding physical addresses, and has access to an address translation store for storing address translation data used to convert a virtual address to a physical address within said memory, said address translation data being derived from descriptor information stored in page tables within said memory;

said target address range comprises said at least one destination address range; and the apparatus further comprises a setup controller arranged, prior to the data transfer controller performing said transfer operation, to issue a control signal to cause the page tables within said memory to be updated so that virtual addresses that were translated into physical addresses within said at least one source address range will instead be translated into physical addresses within said at least one destination address range, the setup controller further issuing a control signal to cause invalidation within the address translation store of any entries that provide address translation data for the data to be subjected to the transfer operation, whereby access requests issued while the transfer operation is being performed, and that relate to the data being transferred by the transfer operation, will specify as the physical target address an address within the destination address range and hence will be subjected to the memory redirection operation.

2. An apparatus as claimed in claim 1, wherein said redirect controller is arranged to perform said memory redirection operation such that:

when the intercepted access request is a read access request, the target address is mapped to a corresponding source address within said at least one source address range so as to cause a read operation to be performed from said corresponding source address; and when the intercepted access request is a write access request, the target address is mapped to a corresponding source address within said at least one source address range and a corresponding destination address within said at least one destination address range so as to cause a write operation to be performed to both the corresponding source address and the corresponding destination address.

3. An apparatus as claimed in claim 1, wherein said data transfer controller is arranged to maintain a record of progress of the transfer operation, and said redirect controller is arranged to perform said memory redirection operation such that:

when the target address of the intercepted access request relates to an address whose data has yet to be transferred by the transfer operation, the target address is mapped to a corresponding source address so as to cause an access to be performed to that corresponding source address; and when the target address of the intercepted access request relates to an address whose data has already been transferred by the transfer operation, the target address is mapped to a corresponding destination address so as to cause an access to be performed to that corresponding destination address.

4. An apparatus as claimed in claim 1, wherein said data transfer controller is arranged to maintain a record of progress of the transfer operation, and said redirect controller is arranged to perform said memory redirection operation such that:

when the target address of the intercepted access request relates to an address whose data has yet to be transferred by the transfer operation, the data transfer controller is arranged to initiate transfer of a block of data that includes the data associated with the target address, prior to processing the intercepted access request; and when the target address of the intercepted access request relates to an address whose data has already been transferred by the transfer operation, the target address is mapped to a corresponding address that is one of the corresponding source address and the corresponding destination address, so as to cause an access to be performed to that corresponding address.

5. An apparatus as claimed in claim 1, further comprising:

control storage to store control information used to control performance of the transfer operation by the data transfer controller, the control storage storing an indication of said at least one source address range, an indication of said at least one destination address range, and progress indication data identifying progress of the transfer operation.

6. An apparatus as claimed in claim 5, wherein:

the redirect controller is arranged, while the transfer operation is being performed, to reference the control storage to determine whether a received access request is to be intercepted and thus subjected to the memory redirection operation.

7. An apparatus as claimed in claim 1, wherein the data transfer request is issued in order to transfer data from at least one source page to at least one destination page within the memory.

8. An apparatus as claimed in claim 1, wherein the apparatus is arranged to be coupled to a plurality of processing elements that have access to said memory, each processing element having an associated address translation store, and the setup controller is arranged to issue a control signal to cause invalidation within each address translation store of any entries that provide address translation data for the data to be subjected to the transfer operation.

9. An apparatus as claimed in claim 1, wherein upon completion of the transfer operation, the redirect controller is prevented from intercepting a subsequent access request that specifies a target address within the target address range.

10. An apparatus as claimed in claim 1, wherein the processing element has access to at least one cache structure for caching data accessed in said memory, a cache coherency protocol is employed to ensure coherency between cached data and data stored in the memory, and the cache coherency protocol is employed in relation to access requests issued by the data transfer controller during performance of the transfer operation in order to ensure that a most up-to-date version of data specified by said access requests is accessed by the data transfer controller.

11. An apparatus as claimed in claim 10, wherein the data transfer controller is arranged, when issuing read access requests during performance of the transfer operation in order to read the data within said at least one source address range, to employ a specified type of read access request that causes any cached copies of that data to be invalidated during application of the cache coherency protocol.

12. An apparatus as claimed in claim 11, wherein the apparatus is arranged to be coupled to a plurality of processing elements that each have access to at least one associated cache structure, and the data transfer controller is arranged to employ said specified type of read access request in order to cause cached copies of said data in the associated cache structures of any of said plurality of processing elements to be invalidated during application of the cache coherency protocol.

13. An apparatus as claimed in claim 11, wherein said specified type of read access request is a read exclusive access request.

14. An apparatus as claimed in claim 1, wherein said transfer operation is employed to perform one of the following type of data transfer:
a gather of data from multiple source address ranges into a single destination address range;
a scatter of data from a single source address range into multiple destination address ranges; or
a transfer of data from a source address range to a same-sized destination address range.

15. An apparatus as claimed in claim 1, wherein said transfer operation comprises one of a move operation and a copy operation.

16. A system comprising:
a plurality of processing elements; and
an interconnect coupled to said plurality of processing elements and for controlling access to a memory by said plurality of processing elements;
the interconnect having a transfer engine comprising:
a data transfer controller, responsive to a data transfer request received by the transfer engine from one of the processing elements, to perform a transfer operation to transfer data from at least one source address range in memory to at least one destination address range in the memory; and
a redirect controller arranged, while the transfer operation is being performed, to intercept an access request that specifies a physical target address within a target address range, and to perform a memory redirection operation to redirect the physical target address to at least one of a physical address within the at least one source address range and a physical address within the at least one destination address range dependent on the access request
wherein:
the processing elements are arranged to implement address translation of virtual addresses to corresponding physical addresses, and have access to an address translation store for storing address translation data used to convert a virtual address to a physical address within said memory, said address translation data being derived from descriptor information stored in page tables within said memory;
said target address range comprises said at least one destination address range; and
the apparatus further comprises a setup controller arranged, prior to the data transfer controller performing said transfer operation, to issue a control signal to cause the page tables within said memory to be updated so that virtual addresses that were translated into physical addresses within said at least one source address range will instead be translated into physical addresses within said at least one destination address range, the setup controller further issuing a control signal to cause invalidation within the address translation store of any entries that provide address translation data for the data to be subjected to the transfer operation, whereby access requests issued while the transfer operation is being performed, and that relate to the data being transferred by the transfer operation, will specify as the physical target address an address within the destination address range and hence will be subjected to the memory redirection operation.

17. A system as claimed in claim 16, wherein the transfer engine is responsive to an indication of bandwidth utilisation within the interconnect to throttle performance of the transfer operation.

18. A system as claimed in claim 16, comprising:
a further interconnect connected to said interconnect and for controlling access to a further memory by said plurality of processing elements, the further interconnect having a further transfer engine for performing a transfer operation on behalf of one of the processing elements in order to transfer data from at least one source address range to at least one destination address range, while enabling access requests issued by the plurality of processing elements in respect of the data that is being subjected to the transfer operation to continue to be processed while the transfer operation is being performed.

19. A system as claimed in claim 18, wherein the transfer engine is employed to handle the transfer operation when the at least one destination address range is within said memory, and the further transfer engine is employed to handle the transfer operation when the at least one destination address range is within said further memory.

20. A method of transferring data between address ranges in memory, comprising:
responsive to a data transfer request received from a processing element, employing a data transfer controller to perform a transfer operation to transfer data from at least one source address range in the memory to at least one destination address range in the memory;
while the transfer operation is being performed, intercepting an access request that specifies a physical target address within a target address range, and performing a memory redirection operation to redirect the physical target address to at least one of a physical address within the at least one source address range and a physical address within the at least one destination address range dependent on the access request;
wherein:
the processing element is arranged to implement address translation of virtual addresses to corresponding physical addresses, and has access to an address translation store for storing address translation data used to convert a virtual address to a physical address within said memory, said address translation data being derived from descriptor information stored in page tables within said memory;
said target address range comprises said at least one destination address range; and
the method further comprises performing a setup control operation, prior to the data transfer controller performing said transfer operation, to cause the page tables within said memory to be updated so that virtual addresses that were translated into physical addresses within said at least one source address range will instead be translated into physical addresses within said at least one destination address range, and to cause invalidation within the address translation store of any entries that provide address translation data for the data to be subjected to the transfer operation, whereby access requests issued while the transfer operation is being performed, and that relate to the data being transferred by the transfer operation, will specify as the physical target address an address within the destination address range and hence will be subjected to the memory redirection operation.

* * * * *